Aug. 4, 1959 — YUJI KAMATANI — 2,897,599
ELECTRODE CLAMP FOR ELECTRIC FURNACE
Filed Oct. 2, 1957 — 2 Sheets-Sheet 1
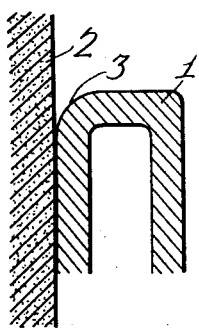
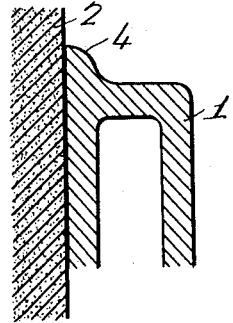
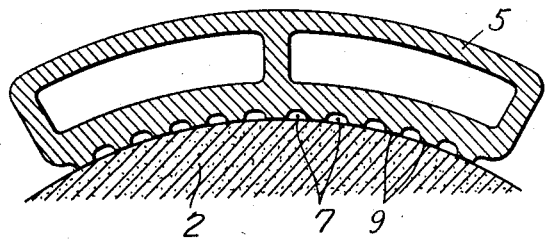
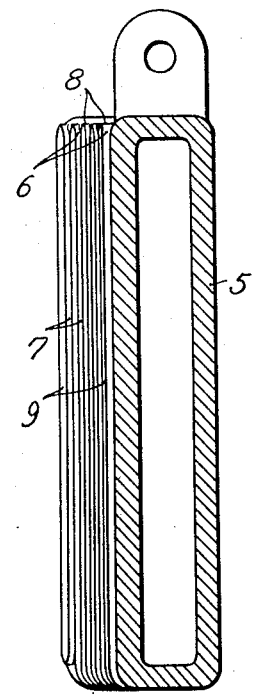
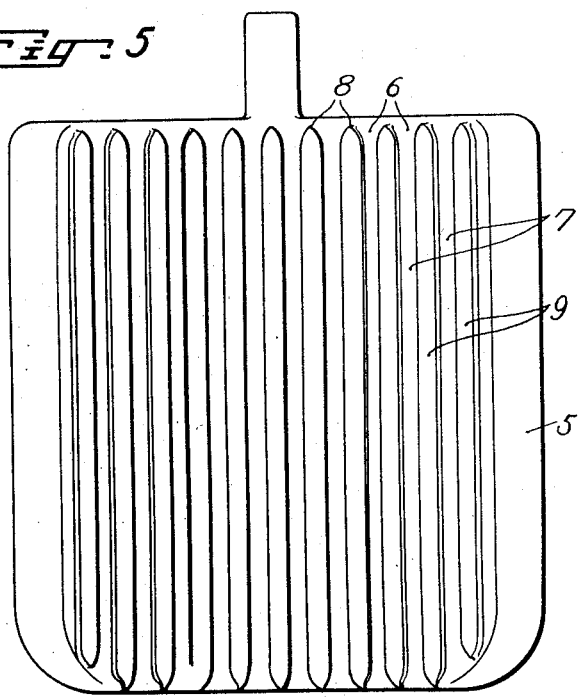
INVENTOR.
Yuji Kamatani
BY Scrivener and Parker,
attorneys Aug. 4, 1959  YUJI KAMATANI  2,897,599
ELECTRODE CLAMP FOR ELECTRIC FURNACE Filed Oct. 2, 1957  2 Sheets-Sheet 2

INVENTOR.
Yuji Kamatani
BY Scrivener and Parker,
attorneys

2,897,599
ELECTRODE CLAMP FOR ELECTRIC FURNACE

Yuji Kamatani, Ishikawa Prefecture, Japan

Application October 2, 1957, Serial No. 687,703

Claims priority, application Japan March 4, 1957

1 Claim. (Cl. 13—16)

The present invention relates to improvements in or relating to electrode clamps.

The object of the present invention is to provide such a clamp adapted to increase the electric conductivity of such clamps and to effect a closer contact between the electrode and electrode clamp, and to prevent deformation, damage or excessive baking of the electrode.

A further object of the present invention is to provide an electrode clamp which is so constructed and arranged that accumulations of dust and dirt between the surface of the clamp and the electrode is effectively prevented.

The features and advantages of the present inventon will be apparent in the following description with respect to the present invention.

The invention is described in the following specification and an embodiment thereof is illustrated in the accompanying drawings, in which:

Fig. 1 is a fragmental sectional view of a prior art device;

Fig. 2 is a fragmental sectional view of a second prior art device;

Fig. 3 is a fragmental, transverse sectional view of my invention;

Fig. 4 is a vertical sectional view thereof;

Fig. 5 is a front elevational view of the electrode clamp of the present invention.

Figure 6:
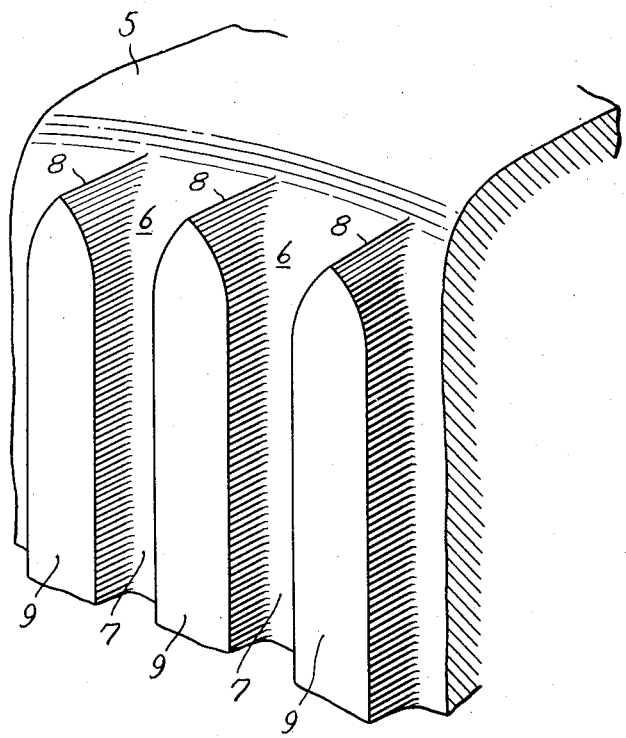
Fig. 6 is an enlarged fragmental perspective view of a portion of the clamp.

Heretofore various means have been provided to prevent dirt or dust from affecting the contact between the electrode and its associated clamp. It has been suggested that streams of air be directed against the surfaces to dislodge the particles of dirt and dust. It has also been suggested that dust skirts be affixed to the electrode to protect the clamp. Neither is effective.

Figs. 1 and 2 represent typical electrode clamps 1 as heretofore used. The clamp 1 disclosed in Fig. 1 has a curved surface 3 formed at the upper end thereof adjacent the surface of the electrode 2. In such a structure dust and dirt tend to fall into the crevice so formed and interfere with desirable operation of the parts. In Fig. 2 the clamp 1 is provided wth a rib 4 arranged on the upper surface of the clamp. Such structure is also ineffective for preventing the accumulation of dust because of the surface deformation that occurs.

When the clamp is made of an electrical conductor, the relationship between the electrical contact area of the electrode clamp with the electrode and the electric current passing capacity, i.e. the current density, is usually approximately 1.5 to 2 amperes/cm.$^2$, is 70 to 100 times as compared with the sectional area of electric conductor of the same circuit and corresponds to approximately 10 times of the contact clamp joint. The electric current is fed at the minimum current density of the circuit, i.e. the maximum calculated safety factor. However, because a deformation due to thermal stress is then liable to occur because of the size of the clamp, poor contact will be caused. It is therefore evident that there is a discrepancy between the planned contact current density and the effective values, and an instability in the contact effect of the clamp with the electrode or the electrode casing is caused. The electrode clamp has to be kept clean to be closely fitted to an electrode from the point of its application; if a perfect contact ratio is maintained despite the electrode condition, the clamp can accomplish the purpose satisfactorily with a contact area of about $\frac{1}{10}$ the size of a usual clamp, i.e. a current density of 10–15 amperes/cm.$^2$.

The electrode clamp according to the present invention provides a dust proof contact surface between the electrode clamp and electrode by providing channel lines with bell-mouth openings on the inner surface of the clamp and by forming longitudinal grooves therethrough along the inner wall thereof, thereby imparting to said clamp slideability and closer contact to the electrode.

Novel means are provided for achieving this result. Such means are shown in the drawings, see Fig. 3, wherein the clamp 5 abuts the electrode 2. The surface of the clamp is provided with a series of longitudinally extending ribs 9 which are curved to conform to the curvature of the electrode 2. These ribs are separated by grooves or channels 7. The upper and lower ends of the ribs 9 are pointed, as shown clearly in Fig. 6. These edge portions 8 are so constructed and arranged that they provide enlarged openings 6 to the grooves formed between the ribs 9.

It will readily be seen that any dust or dirt falling on the clamp or the electrode will be directed by the openings 6 to the grooves 7 and thence downwardly and will not, therefore, interfere with the contact between the clamp and the electrode.

Further, when the electrode 2 is moved downwardly the upper edge portions 8 of the ribs 9 will contact the electrode first and will remove from the surface of the electrode any dirt, dust, etc. thereon. Unbaked portions of a continuous self-baking electrode will also be removed. The particles so removed pass through the grooves formed between the ribs 9.

Thus, the electrode clamp of this invention improves the grasping and contacting effects, increase the durability of the clamp itself, provides a remarkable effect in the continuous safety operation of the electric furnace, and thus improves the efficiency of electric furnace. The electrode clamp exhibits an extremely high efficiency as used with solid baking electrodes, Migay's or Fujiyama's semi-baking electrodes and Söderberg type self-baking electrodes which are used widely in the manufacture of ferroalloys, carbide, chemical fertilizer, ferrous or abrasive materials and the manufacture of other metals or non-metals, independently of the capacity, type and arrangement of electrodes for the electric furnace.

What I claim is:

An electrode clamp having an elongated laterally curved surface adapted to conform to the surface of the electrode, said clamp surface being provided with a series of longitudinally extending spaced contact members, the surfaces of which are curved longitudinally in conformity with the surface of the electrode, the respective ends of said contact members being pointed to provide enlarged openings to the grooves formed between said contact members.

References Cited in the file of this patent

UNITED STATES PATENTS

| | | |
|---|---|---|
| 1,335,895 | Hughes | Apr. 6, 1920 |
| 1,552,619 | Klugh | Sept. 8, 1925 |
| 2,494,775 | Moore | June 17, 1950 |